United States Patent [19]

Tomlinson, Jr.

[11] 4,313,510

[45] Feb. 2, 1982

[54] WEIGHING SCALE WITH DYNAMIC ZERO ERROR CORRECTION

[75] Inventor: Harold W. Tomlinson, Jr., Liverpool, N.Y.

[73] Assignee: General Electric Company, New York, N.Y.

[21] Appl. No.: 209,751

[22] Filed: Nov. 24, 1980

[51] Int. Cl.³ .................................................. G01G 13/14
[52] U.S. Cl. ............................... 177/165; 177/DIG. 3
[58] Field of Search .................. 177/164, 165, DIG. 3

[56] References Cited

U.S. PATENT DOCUMENTS

| | | | |
|---|---|---|---|
| 3,777,828 | 12/1973 | Dietemeyer | 177/DIG. 3 |
| 4,029,162 | 6/1977 | Krolick et al. | 177/165 |
| 4,044,846 | 8/1977 | Matilainen | 177/165 |
| 4,082,153 | 4/1978 | Provi | 177/DIG. 3 |
| 4,094,371 | 6/1978 | Ferrell | 177/DIG. 3 |
| 4,155,411 | 5/1979 | Weaver | 177/165 |

FOREIGN PATENT DOCUMENTS

| | | | |
|---|---|---|---|
| 2625476 | 12/1977 | Fed. Rep. of Germany | 177/165 |
| 2738409 | 3/1978 | Fed. Rep. of Germany | 177/164 |

Primary Examiner—George H. Miller, Jr.
Attorney, Agent, or Firm—George R. Powers; Leonard J. Platt; John F. Cullen

[57] ABSTRACT

A weighing scale with an electrical output includes a mechanical-to-electrical signal transducer which has a zero weight signal value which may vary in response to ambient conditions. The scale includes a fast acting switch operable to provide a switching function in response to the initiation of the placement of a weight upon the scale and a weight registering circuit operable in response to the switching function to register and store a zero weight signal before the signal transducer begins sensing the weight. The weight registering circuit is then operable to register the difference between the zero weight signal value and the ultimate signal from the transducer as the true weight.

10 Claims, 8 Drawing Figures

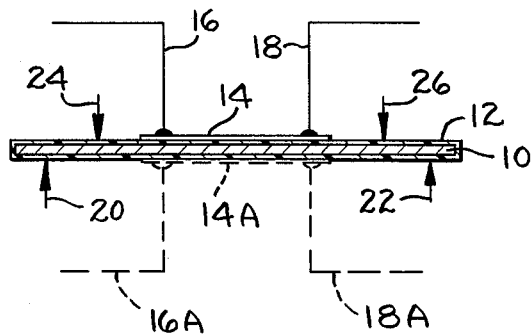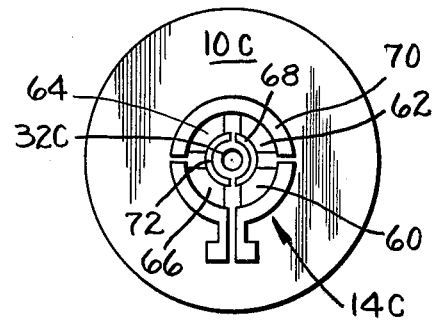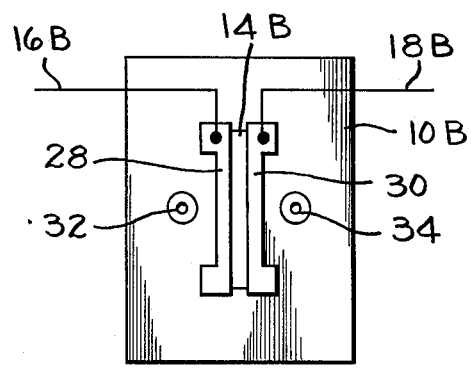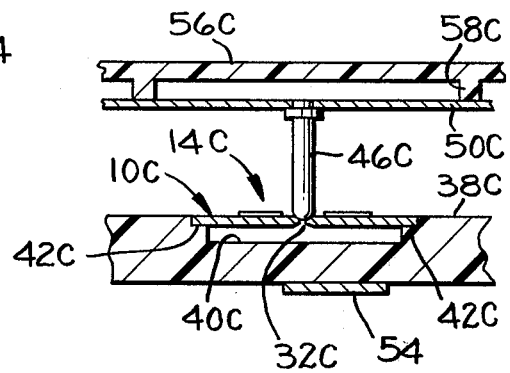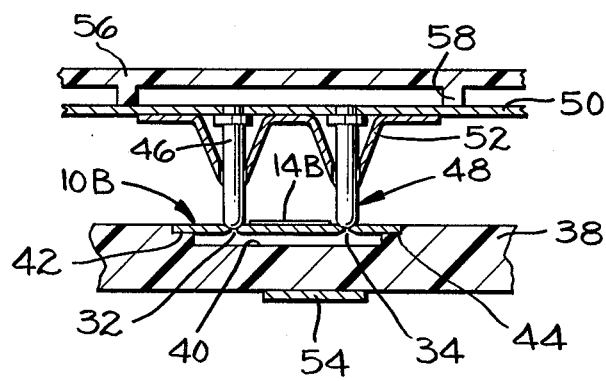

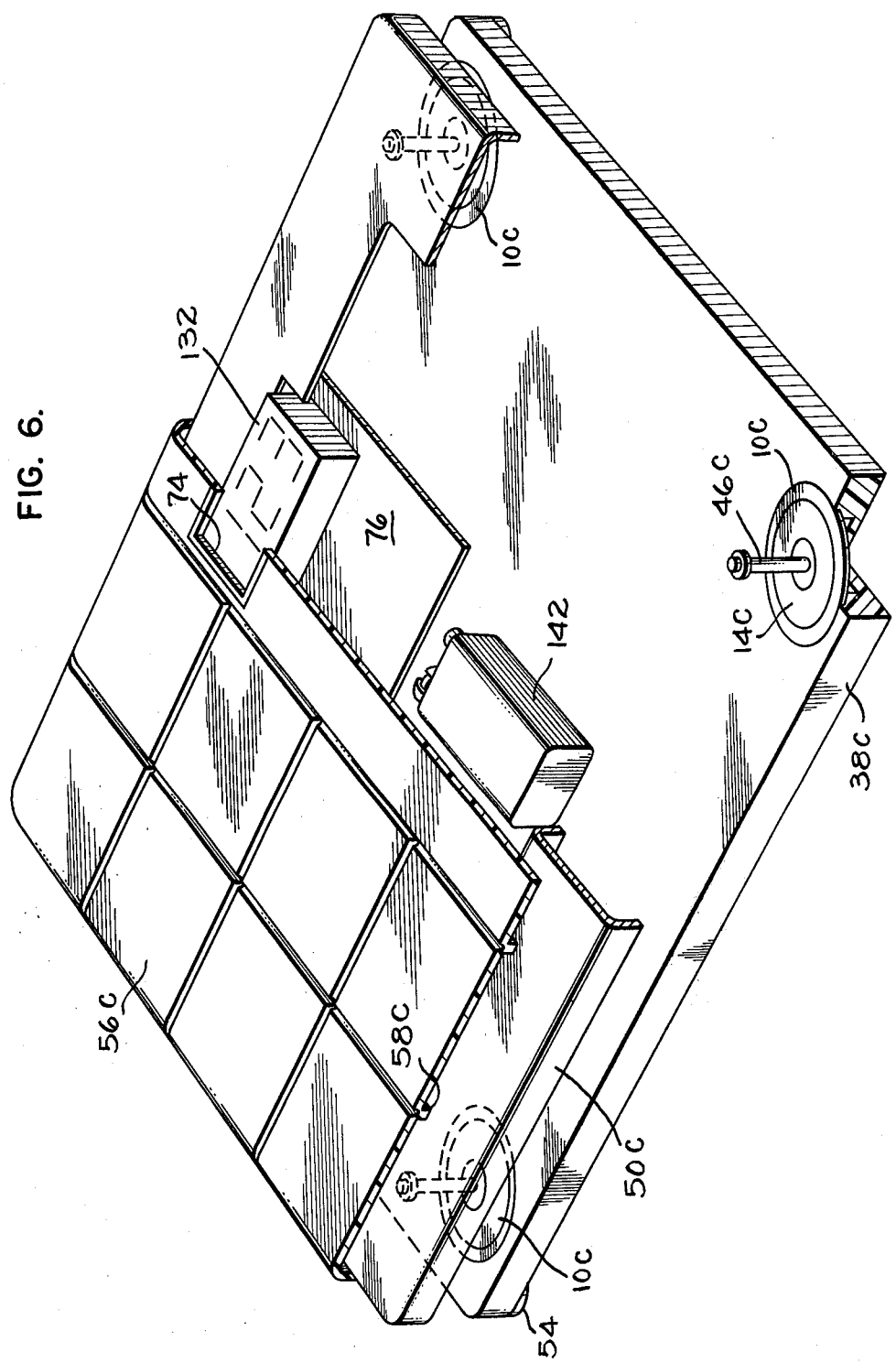

WEIGHING SCALE WITH DYNAMIC ZERO ERROR CORRECTION

BACKGROUND OF THE INVENTION

1. Field of the Invention

This invention relates to weighing scales having electrical outputs, and especially to "bathroom" scales having digital output indicators.

There is a continuing need for inexpensive means for accurately measuring forces and weights both for commercial and for personal purposes. For instance, many people are concerned about their weight for both health and appearance reasons, and consequently there is a great need for weighing scales for personal use, commonly referred to as "bathroom" scales. As a result, there is a constant effort to produce new scale designs which are low in cost, high in accuracy, easy to read, easy to use, durable and shock resistant, and small in size and light in weight.

2. Description of the Prior Art

One of the most serious problems in providing high accuracy in a household "bathroom" scale arises from the need for providing an accurate zero reading. Most mechanical scales are provided with mechanical zero calibration adjustment dials which must be constantly readjusted in order to assure the accuracy of the scale from the standpoint of establishing an accurate zero reading. Scales with electrical output indicators, which are usually digital readout scales, suffer from this same problem. One prior solution to this problem in an electrical readout scale has been to provide a kick-switch which is to be operated by the user, such as by pressing a button in the side of the scale housing, before stepping on the scale. The actuation of that switch serves to provide a zero calibration for the scale to provide a subsequent accurate weight measurement in terms of eliminating a zero error.

However, there are various disadvantages to such an arrangement. For instance, an extra motion is required by the user, which is undesirable. Furthermore, a user who is unfamiliar with the scale will not know how to use it correctly. Still further, the mechanical disturbance of the scale mechanism caused by kicking the kick-switch is not conducive to scale accuracy and to long scale life.

The present invention is believed to overcome these problems.

SUMMARY OF THE INVENTION

It is an object of the invention to provide for improved error correction in a scale having electrical readout circuits.

It is another object of the invention to provide a scale with automatic dynamic zero error correction which does not require any special instruction or familiarity on the part of the user with the operation of the scale.

In a co-pending patent application Ser. No. (209,749) for "THICK FILM RESISTOR FORCE TRANSDUCERS AND WEIGHING SCALES" filed concurrently with the present application by Michael L. Ostrelich, and assigned to the same assignee as the present application, a new scale is disclosed. That scale employs a plurality of separate mechanical-to-electrical force transducers, preferably four, which are arranged in the four corners of the scale and electrically connected for electrical summing of the signals from the different transducers. The transducers of that scale are temperature-sensitive so that they provide different zero weight readings depending upon the transducer temperatures. Furthermore, different temperatures for different transducers produce changes in transducer operation, particularly in terms of the zero calibration reading.

Accordingly, it is an important object of the present invention to provide a zero calibration and zero error correction arrangement which is especially helpful with a scale of the type disclosed in that co-pending patent application.

Further objects, features and advantages of the invention will be apparent from the following description and the accompanying drawings.

In carrying out the invention, there is provided a weighing scale comprising at least one mechanical-to-electrical signal transducer for sensing a weight to be weighed mechanically and for providing an electrical signal output indicative of a sensed weight, a weight registering circuit and a weight indicator connected to said transducer, said transducer being operable to produce a zero weight signal value which may vary in response to ambient conditions such as temperature, said transducer having a finite time delay in producing an electrical signal output in response to a weight to be measured, a fast acting pressure responsive switching means operable to provide a switching function in response to the initiation of the placement of a weight to be weighed upon said scale, said weight registering circuit including means operable in response to said switching function of said pressure responsive switching means to register and store a zero weight signal value before said signal transducer begins sensing the weight to be weighed, said weight registering circuit then being operable to register the difference between the zero weight signal value and the signal from said transducer while sensing the weight to be weighed for indication as the true weight.

Since the present invention is especially useful for scales such as disclosed in the Ostrelich patent application mentioned above, the present invention is disclosed in detail below in connection with such scales.

BRIEF DESCRIPTION OF THE DRAWINGS

FIG. 1 is a schematic sectional side view of a preferred embodiment of a transducer in accordance with the present invention.

FIG. 2 is a top view of one practical embodiment of a transducer body in accordance with the present invention.

FIG. 3 is a side sectional view showing the transducer of FIG. 2 incorporated into a device for measuring a force.

FIG. 4 is a top view of a circular transducer configuration in accordance with the present invention.

FIG. 5 is a sectional side view of a device for measuring force which incorporates the transducer of FIG. 4.

FIG. 6 is a perspective view partly in section of a weighing scale incorporating four of the transducers and force measurement devices previously shown and described in connection with FIGS. 4 and 5.

DESCRIPTION OF THE PREFERRED EMBODIMENTS

Figure 7:
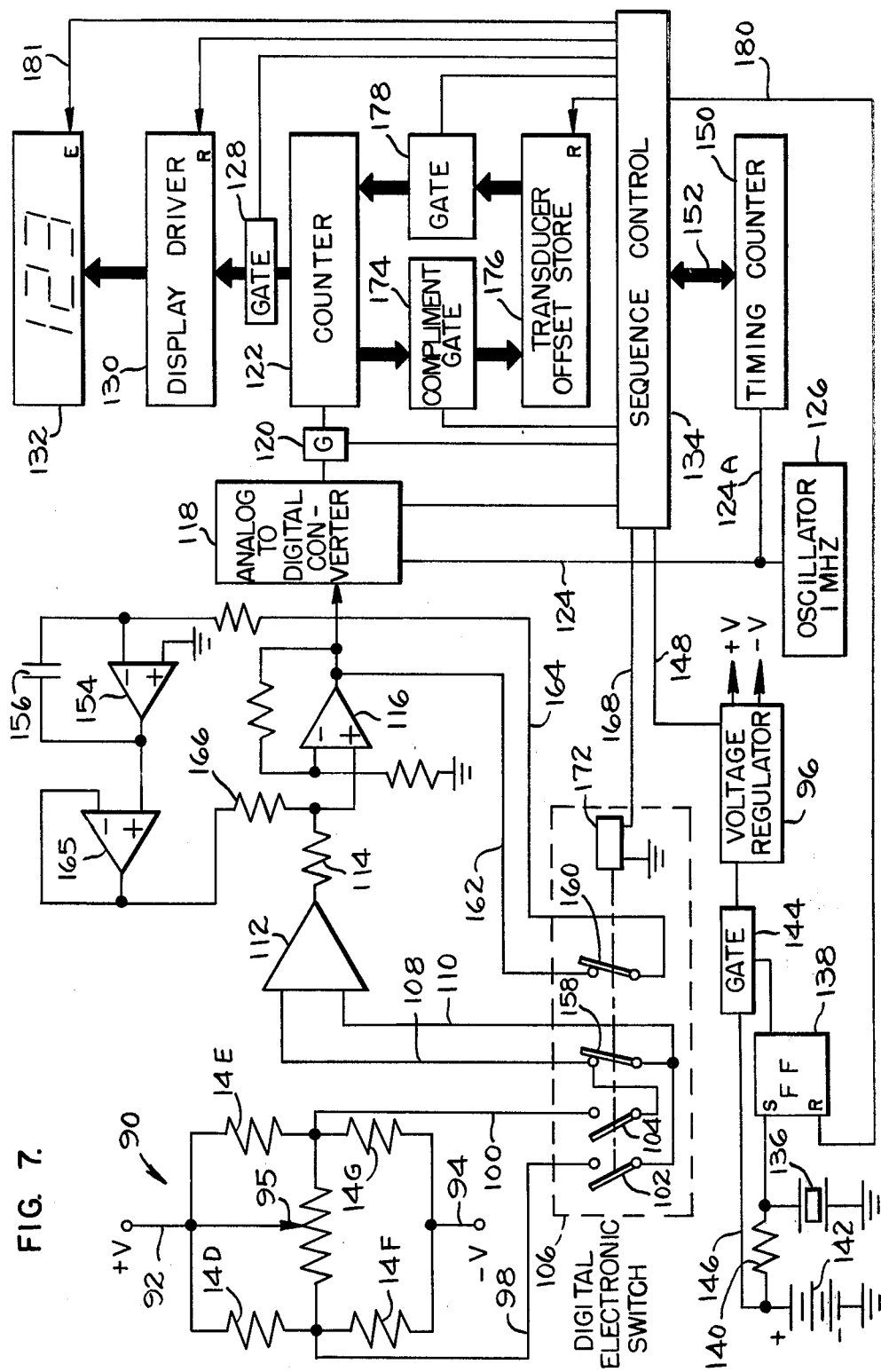
FIG. 7 is a schematic circuit diagram illustrating the electrical circuits of the scale of FIG. 6.

Referring particularly to FIG. 1, the transducer is shown as having a body including a flexible metal substrate member 10 in which a strain is to be measured as a measure of a mechanical force. The entire outer surface of the metal substrate member 10 is covered with an insulating material layer 12 which is preferably a porcelain enamel which has been baked onto the surface of the metal 10. Upon a portion of the upper surface of the insulating layer 12 a resistance element 14 is formed from a layer of substantially uniform thickness of a thick film resistor ink of the type used for thick film integrated circuits. The resistor ink is fused upon the insulating layer 12 at a high temperature and thus forms an integral part of the transducer body. It has been discovered that the resistance element is operable to measure a mechanical force upon the body in terms of the change in resistance of the resistance element in response to a mechanical strain in the body. Electrical connections are schematically shown at 16 and 18 to the resistance element 14 for the purpose of measuring changes in electrical resistance.

The resistance element 14 is preferably laid down in a predetermined pattern by a printing process, such as screen printing. Preferably, the pattern is a very simple rectangle with the long dimensions of the rectangle running parallel to the direction between the two electrical connections 16 and 18. The application of mechanical forces to the body is schematically indicated by arrows 20, 22, 24 and 26. The lower force arrows 20 and 22 may be regarded as mechanical supports for the edges of the body, and the upper arrows 24 and 26 may be regarded as opposing force or weight transmitting members which, operating in conjunction with the force transmitting members 20 and 22 cause a simple downward bend (strain) in the body 10.

Although the porcelain coating 12 is relatively brittle, as is the resistor 14, the bending of the body is not great enough to cause the porcelain or the resistor to be chipped or broken. However, it has been discovered, surprisingly, that the resultant strain in the resistor 14 causes a very clearly measurable change in resistance of resistor 14. When the resistor is on the upper surface of the body, as shown, and the body is bent downwardly, as it would be with the force elements illustrated, it has been discovered that the electrical resistance of resistor 14 is reduced. This is believed to be due to the fact that the constituent particles within the resistor 14 which are at least partially conductive, are squeezed together to provide increased conductivity between such particles. However, the exact mechanism is not fully known. It has also been discovered that if the body of the device is turned over in relation of the force transmitting members 20-26, so that the resistor 14 is on the bottom of the body instead of on the top, (as indicated in phantom at 14A) and so that the bending tends to place the resistor 14 under tension rather than under compression, the resistance of the resistor 14 increases with increasing strain. The explanation for this is believed to be that the constituent conductive particles within the resistor 14 are separated by the strain so as to increase the resistance of the resistor 14.

It will be understood, of course, that the production of the transducer may be standardized, and that the position of the resistor at 14 on the upper surface or at 14A on the lower surface in relation to the force transmitting members 20-26 can be changed by simply turning the body over. Since the transducer body is very thin, it is sometimes referred to hereinafter as a "wafer".

It has long been known that the resistors produced by fused resistor inks used in thick film integrated circuits was subject to change when the substrates were placed under stress. However, that effect has been regarded as basically a problem to be overcome in order to maintain a desired stability of resistance values. It is somewhat surprising, therefore, that, not only does the resistance change based upon the strain on the body, but the change is predictable and can be calibrated accurately to provide an accurate measurement of the forces applied.

In some ways, the resistors of the transducers of the present invention operate in a manner somewhat analogous to electrical resistance strain gauges, which are usually made of a very fine wire or a vapor deposited metal foil arranged in a grid pattern. However, strain gauges are generally devices which are attached to structural parts to measure the strain within those structural parts in response to a known stress. By contrast, the transducers of the present invention employ thick film printed resistors which are integrally formed upon a metal substrate, and are operable to measure a force (stress) in terms of the resultant strain within the substrate in response to that force. Furthermore, while the electrical resistance strain gauges always require that the gauges have a particular alignment with respect to the direction of the strain, the thick film resistors of the present invention are very responsive to strains, no matter what the direction of the strain in relation to the alignment of the printed resistor. Thus, there appears to be a "bulk" resistance change effect.

Another extremely important difference between conventional foil strain gauges and the printed circuit force transducers of the present invention is the difference in cost. At present, the foil or wire strain gauges are in the order of thirty times as costly as the transducers in accordance with the present invention.

In spite of all of the differences enumerated above, it has been found that the printed thick film resistor component of the force transducer of the present invention can be analyzed and can be mathematically compared to the prior resistance strain gauges, using information which is available in the literature, such as for instance, in the book entitled "THE STRAIN GAUGE PRIMER" by C. C. Perry and H. R. Lissner and published by the McGraw Hill Book Company in the second edition in 1962. Such analysis shows that the thick film resistor element is superior to foil type resistance strain gauges in providing a gauge factor in the order of 8 as compared to gauge factors typically ranging from 2 to 4 with foil strain gauges. The gauge factor is the change in resistance in relation to the total resistance versus the change in length in relation to the total length of the resistance element.

At least one other investigator has suggested that screen printed thick film circuit resistors can be used to sense pressure (see a paper entitled "Progress on Hybrid Technology in Italy" by R. Dell'Acqua and F. Forlani of Magneti Marelli of Pavia, Italy beginning at page 247 of the Proceedings of the 1979 International Microelectronics Symposium held by the International Society for Hybrid Microelectronics at Los Angeles, Calif. on Nov. 13 through 15, 1979, and particularly the passage beginning at page 250). However, those investigators seemed to be referring to pressure gauges, and apparently were not working with a metal substrate. The use of a metal substrate, preferably steel, having a high modulus of elasticity, operating as a beam, provides for a high strain in the resistor for a given stress thus providing a large signal in response to stress. It is believed to be a very important discovery in the present invention that a metallic elastic beam body can be used as the substrate for a thick film printed resistor to provide a thick film resistor transducer. Perhaps a metal such as steel was previously regarded as too flexible or elastic to be used as a flexing beam in a transducer employing an insulating coating of porcelain and a thick film screen printed resistor.

It is believed that virtually any of the thick film resistor inks can be employed to produce an operable transducer in accordance with the present invention. Generally speaking, it is believed that the best ink materials for producing a good stable thick film resistor are also the best materials for producing the resistor portion of the transducer of this invention. For instance, one excellent material has been found to be a ruthenium dioxide ink available from Thick Film Systems, Inc., 324 Palm Avenue, Santa Barbara, Calif. 93101 under their product No. 600-103. This is an ink which is especially formulated to be fired at a temperature in the order of 600° C. so that it can be fired over a porcelain insulating layer upon a steel substrate. While alumina is the usual substrate for screen printed resistors, porcelainized steel has been proposed and has been used for such resistors, but not for force transducers.

While the exact composition of the above mentioned ink is not known, it is believed to be essentially a combination of finely divided ruthenium dioxide particles and a finely divided glass frit together with the usual thick film ink binders and vehicles which are burned off and disposed of in the firing cycle. The firing cycle is described below. Other thick film resistor ink compositions which produce desirable resistors are believed to be very useful in the practice of the present invention as well. For instance, inks containing bismuth ruthenate are believed to be quite effective.

In FIG. 1, the vertical dimensions of the structure have been exaggerated for clarity. In one typical structure, the metal substrate 10 has a thickness of only 1.47 millimeters and the porcelain insulating layer and the thick film resistor each have a thickness in the order of about 0.025 millimeters. However, the resistor always has a thickness of at least 0.013 mm. and usually about 0.025 mm.

While it is preferred that the porcelain insulating layer 12 completely surrounds the steel substrate 10, it is not necessary that all surfaces of the steel be electrically insulated. Accordingly, it is only necessary to insulate the area upon which the resistor 14 is to be deposited. While not illustrated in FIG. 1, the electrical contacts to the resistor 14 are also preferably carried out by thick film printing with a conductive ink which preferably contains silver.

The thick film resistor 14, as mentioned above, is preferably produced by a printing process, and preferably a screen printing process, the resistor ink used initially to lay down the resistor pattern being in the form of a paste. After printing, the resistor is air dried at about 20° C. for about ten minutes, followed by a bake at about 125° C. to dry out the volatile solvents. The ink is then subjected to a firing sequence. Preferably, the firing sequence is carried out in a continuous conveyor oven in which the temperature of the part is raised steadily from an ambient temperature, or near ambient temperature, for about seventeen minutes to a peak firing temperature in the range from about 600° C. to 650° C., is maintained at the peak firing temperature for about ten minutes, and then lowered steadily for about seventeen minutes to the ambient temperature. Thus, the complete firing cycle is about forty-four minutes long.

The steel substrate 10 is preferably composed of an extra low carbon steel which is especially desirable for receiving porcelain enamel coatings.

If desired, or required, the resistor element can be trimmed to increase the starting resistance by the use of a laser beam in a technique which is known in the thick film printed resistor art. By means of such trimming, the resistor value can be controlled to within one-half of one percent of a desired value. This is especially useful when matching transducers which are to be combined in a weighing scale as described more fully below.

It is evident from FIG. 1 that the position of the resistance element 14 (and the resistance element 14A) upon the substrate 10 and the positions of engagement of the force transmitting elements 20–26 with the body are arranged to be mutually exclusive. That is, the force transmitting elements do not directly engage the portion of the body upon which the resistance element is formed; therefore they do not engage the resistance element directly. While such an engagement might be permissible, it is preferred to avoid such engagement in order to avoid the possibility of damage to the resistor element, and possible changes in the electrical characteristics due to such damage or wear.

FIG. 2 is a top view of a transducer body or wafer 10B in one practical embodiment. In this embodiment, the thick film resistor 14B is provided with printed conductive electrodes 28 and 30 to which the outgoing electrical conductors 16B and 18B are soldered.

In this particular embodiment, depressions are provided in the faces of the water, as shown at 32 and 34, in the form of countersunk holes, for the reception of positioning pins which also form parts of the force transmitting members which are shown and described more fully below in connection with FIG. 3.

FIG. 3 is a side sectional view showing the transducer of FIG. 2 incorporated into a device for measuring a force between opposed force transmitting members included within the device. The device is shown to include a base plate 38 having a cavity therein, as indicated at 40, with shelf-like ledges on two opposed sides, as indicated at 42 and 44. These shelf-like ledges serve as the force transmitting members or elements corresponding to the force transmitting elements 20 and 22 of FIG. 1. Also, the outer edges of cavity 40 serve to confine and position the wafer body at the outer peripheral edges thereof.

Pins 46 and 48 are provided which engage the body 10 at the positioning depressions 32 and 34. The pins 46 and 48 are additional force transmitting members corresponding to the force transmitting elements 24 and 26 of FIG. 1. The pins 46 and 48 receive their force from a loading plate 50 which receives the load or force which is to be measured through parts 56 and 58. Also attached to the loading plate 50, there is provided a part 52 which is shaped in cross section like a letter W. The part 52 includes openings at the bottom edges thereof to permit the pins 46 and 48 to pass through. However, the remainder of the bottom edge of each side of the part 52 preferably provides an edge which engages the upper surface of the wafer body 10 to distribute the force across the upper surface so that the force is not entirely applied through the respective pins 46 and 48. The device may also include a foot 54 beneath the base plate 38 to engage a supporting surface. The part 56 is a cover plate which receives the force to be measured, the force then being transmitted through spaced ribs 58 to the loading plate 50.

The device, as illustrated in FIG. 3, may be one of a plurality of similar force measuring devices within a weighing scale, in which case many of the components of the device may be common with the corresponding components of the scale. Thus, the base plate 38 may be a common base plate for the scale, and the cover 56 and the loading plate 50 may be, respectively, common cover and loading plate elements of the scale.

FIG. 4 is a top view of a circular transducer wafer body 10C having a central depression 32C therein, and having a thick film resistor 14C arranged in a circular pattern surrounding and centered upon the central depression 32C. The pattern of the resistor 14c includes four pie-shaped sectors 60, 62, 64, and 66. Incoming leads are solder connected to printed conductive sector tabs at the outer peripheral edges of sectors 60 and 66. The inner edge of sector 60 is cross-connected at 68 to the inner edge of sector 62. The outer edge of sector 62 is interconnected at 70 to the outer edge of sector 64, and the inner edge of sector 64 is connected at 72 to the inner edge of sector 66. Thus, the four sectors 60, 62, 64, and 66 are effectively connected in a series arrangement which provides for a radial flow of current in each sector.

FIG. 5 is a sectional side view of a device for measuring a force incorporating the transducer wafer body 10C of FIG. 4. FIG. 5 corresponds to FIG. 3 in many ways. Thus, it includes a base plate 38C, a force transmitting member in the form of a pin 46C, a loading plate 50C, a cover 56C, and spaced load transmitting ribs 58C. The pin 46C is a central pin, the lower tip of which fits into the central depression 32C, and applies force at that point. As shown, the wafer body 10C fits into a depression 40C in the base plate 38C, which forms a mounting means for the wafer body. The edges of the cavity 40C include portions which engage or surround the outer peripheral edges of the wafer body to confine the body within the cavity. At the edges of the cavity 40C there is provided a circular shelf 42C which supports the edge of the wafer body substantially uniformly around and under the peripheral edge. Thus, the force applied through pin 46C, under compression, which is resisted by the supports formed by the shelf 42C, causes the wafer body 10C to assume a dished shape. This dishing of the wafer body causes a minute compression of the resistor 14C, if it is mounted on the upper surface of the wafer body, and a tension or stretching of the resistor if it is on the lower surface of the wafer body. As previously explained, the compression will cause the resistance to decrease, and the tension will cause the resistance to increase.

In carrying out the invention, it has been found that the characteristics of the thick film resistor have a tendency to change during use over the first few hundred cycles of use, and to become consistent after that time. Accordingly, it is preferred to repeatedly apply stress to the transducer for about five hundred cycles of operation as a part of the manufacturing procedure, so that the transducer provides consistent outputs from then on.

It has also been discovered that the transducers of the present invention have a tendency to change in electrical response at different temperatures. Accordingly, in order to minimize transient temperature changes, it has been found to be desirable to provide for thermal insulation in the vicinity of the thick film resistor of the transducer.

FIG. 6 is a perspective view, partially in section, illustrating the entire organization of a weighing scale incorporating the transducers of FIG. 4 and four of the devices of FIG. 5. The same reference numbers used in FIG. 5 are again used in FIG. 6 for corresponding parts. Four of the transducers 10C are provided in FIG. 6, one at each corner of the scale. The electrical portions of the transducers are connected together in a bridge circuit as described more fully in connection with FIG. 7 below. The cover 56C includes a window 74 through which a light-emitting diode display device 132, which forms a part of the scale, is visible.

The signals from the transducers 14C are processed in a circuit described below in connection with FIG. 7 which may be incorporated for the most part in a printed circuit board 76. Power for the scale is quite limited and may be supplied from a small battery cell 142. The weight to be measured is transmitted from the cover 56C through the integral ribs 58C to the loading plate 50C and is thereby mechanically distributed to the individual pins 46C to the transducers 10C. The cover 56C preferably includes a skirt portion (not shown) which extends down around the outside edges of the base plate 38C.

While it is not entirely evident from the embodiment of FIG. 6, it is possible, with the transducers of the present invention, to produce a scale which has a very limited vertical dimension since the transducers themselves are very thin in the vertical dimension. This is one of the major advantages of the transducers of the present invention and of scales embodying such tranducers.

FIG. 7 is a schematic circuit diagram illustrating a circuit for a preferred embodiment of the scale incorporating the thick film printed transducers and assembled in an organization as represented mechanically in FIG. 6. The four transducers 14D, 14E, 14F, and 14G, are arranged together in a bridge circuit 90 which is supplied with a regulated DC voltage plus V at terminal 92 and minus V at terminal 94. The plus V and minus V voltages are preferably about plus 7 volts and minus 7 volts respectively, and are supplied from a voltage regulator 96, which is referred to again below. A manually adjustable balancing potentiometer 95 is provided for the bridge.

Diagonally opposite pairs of transducers in the bridge are arranged respectively in mechanical compression and in mechanical tension. Thus, transducers 14D and 14G may be in compression, and transducers 14F and 14E may be in tension. As explained earlier in the specification, if a transducer is placed in compression in response to the stress to be measured, the resistance of the transducer decreases. However, if the transducer is placed in tension by the stress to be measured, the measured resistance increases. By the diagonal placement of the compression and tension transducers, the stresses in the transducers change the resistances to provide a maximum bridge unbalancing condition in response to the stresses to be measured, thus providing for the best possible sensitivity of the bridge circuit. Furthermore, the stress signals from all of the transducers are additive, all of them tending to unbalance the bridge in the same direction. Thus, the weight to be measured need not be evenly distributed on the scale platform because the weight components detected by the four transducers are electrically added in the bridge 90.

The unbalance voltage from the bridge 90 resulting from the weight measurement is supplied through connections 98 and 100 and through switch elements 102 and 104 of a switch device 106, and thus through connections 108 and 110 to a DC amplifier 112. The output of the DC amplifier 112 is supplied through a resistor 114 to the input of a second DC amplifier 116 which supplies an output signal to an analog-to-digital converter 118. The analog-to-digital converter operates to provide a series of pulses over a fixed interval of time through a gate 120 to a counter 122. The pulses which are counted by the converter 118 are supplied through a connection 124 from a one megahertz oscillator 126.

The number of pulses supplied over a timed interval is proportional to the DC voltage signal. Thus, the number of pulses counted is proportional to the weight detected by the transducers of the bridge 90. The system is preferably calibrated so that the actual count within the counter 122 represents the weight in pounds, or in metric units. The count within the counter 122 is gated through a gate 128 to a display driver 130 to drive a light-emitting diode multiple decimal digit display device 132. The display driver 130 preferably includes code conversion circuitry for converting from the binary count stored in counter 122 to a seven segment decimal display code for lighting the appropriate segments for the display of each decimal digit for a decimal display representation of the binary number from the counter 122. The display driver 130 also preferably includes a storage register for storing and maintaining a multiple digit decimal number representing the weight after it has been entered from the counter 122 until such time as a new value is entered. The combination of the converter 118 and the display device 132 and the intervening circuitry including counter 122 and display driver 130 is sometimes referred to below as a weight indicator.

The sequential operation of the various gates and switching devices necessary for operation of the circuit is accomplished by a sequence control circuit 134. The entire sequence of operation is preferably initiated by a piezoelectric switch device 136 which is responsive to a pressure signal received by the scale resulting from the placement of a weight to be measured upon the scale platform. While other switch devices, such as membrane switches, may be employed, a piezoelectric switch is preferred. The combination of a piezoelectric switch in a weighing scale together with circuits of the type associated with the piezoelectric switch which are described below forms at least a part of the subject matter disclosed and claimed in a co-pending United States patent application entitled "NON-DEFLECTION PRESSURE SWITCH APPARATUS" Ser. No. (209,750) filed concurrently with the present application by Alfred W. DiMarzio, and assigned to the same assignee as the present application.

The switch 136 is connected to the set input of a flip-flop 138. The set input of flip-flop 138 is normally biased to a positive voltage by a bias voltage supplied through a resistor 140 from the main battery power supply 142. In response to a pressure signal upon the piezoelectric switch 136, the switch generates a series of voltage oscillations which are of a magnitude sufficient to overcome a voltage threshold provided by the positive bias voltage, thus supplying a momentary negative voltage sufficient to set the flip-flop 138. The setting of the flip-flop 138 provides a gating signal from flip-flop 138 to a gate circuit 144 which connects the supply voltage from the battery 142 through a connection 146 and the gate 144 to the voltage regulator 96. Voltage regulator 96 then provides both positive and negative voltages derived from the battery 142 to all of the other components of the circuit, including the sequence control 134. A separate connection 148 is shown from voltage regulator 96 to the sequence control 134 to signify that the operation of the sequence control is initiated by a signal from voltage regulator 96. However, it will be understood that the initiation of power supply voltage to the sequence control 134, as well as to other circuit components, is sufficient to initiate the control sequence.

The combination of switch 136, flip-flop 138, and gate 144 is sometimes referred to below as a switching means which includes means for initiating the application of power to the weight-registering circuits.

The combination of the flip-flop 138 and the gate device 144 not only provides a threshold function, but also constitutes a switch amplifier. The use of a switch amplifier also permits the use of a small, low capacity, fast acting, short gap, mechanical switch, such as a membrane switch, in substitution for the piezoelectric switch, if desired. The term "membrane switch" is intended to refer to a switch of the type commonly used for touch switches for applications such as small calculators employing a film base panel having contact elements formed on the under surface of the film base such as are available from Centralab Incorporated of 5855 Glen Park Road, Milwaukee, Wis. 53201.

The sequence control 134 operates in response to timing signals received from a timing counter 150 through multiple interconnections shown at 152. The timing counter 150 is connected at 124A to receive timing pulses from the oscillator 126.

There are two important sources of error in the output signal displayed at the display device 132 in the system, as thus far described. Both of these sources of error affect the zero weight calibration of the system. One of these sources of error is due to drift in the DC voltage output of the DC amplifier 112, referred to below as amplifier drift offset. Another source of error arises from variations in the stress response signals of the transducers 14D, 14E, 14F, and 14G due to various factors, especially environmental factors and principally fluctuations in temperature. This factor will be referred to below as "transducer offset". Transducer offset is especially serious under conditions where the transducers are not all subjected to the same temperature. The circuit of FIG. 7 includes means for automatically overcoming the zero calibration error from both amplifier drift and transducer offset.

Amplifier 112 is a differential DC amplifier, and may have any one of a number of well known configurations, to which terms such as "bridge amplifier", "instrumentation amplifier" and "difference amplifier" are applied. Such amplifiers are described, for instance, in Chapter 6 of a book entitled "OPERATIONAL AMPLIFIERS" edited by Jerald G. Graeme, Gene E. Tobey, and Lawrence P. Huelsman, and published by McGraw-Hill Book Company. Various circuit configurations employing different numbers of operational amplifiers may be employed for this purpose. However, the preferred circuit is a three operational amplifier configuration shown in FIG. 6.5 of the above mentioned book. Such an amplifier is designed for low DC drift offset. However, it has been found that the amplifier drift offset is still nevertheless a problem in providing the high accuracy desired. Furthermore, with the amplifier drift offset correction which is available in the preferred form of the invention, a less elaborate DC differential amplifier may be employed, if desired.

For correction of the amplifier drift offset, a sample-and-hold amplifier 154 is provided having a feedback loop including a capacitor 156 connected in a sample-and-hold operational amplifier mode. After operation of the scale is first initiated and voltage regulator 96 provides voltage to all of the various circuit components, the switch device 106 is operated to the condition shown, with the switch elements indicated at 158 and 160 closed, and with switch elements 102 and 104 open, as illustrated in the drawing. The closed condition of switch element 158 puts a short circuit (zero signal input) across the two input connections 108 and 110 of amplifier 112. At the same time, the closed condition of contact element 160 provides an interconnection between conductor 162, which carries the output of amplifier 116, and conductor 164 which is the input signal connection to the sample-and-hold amplifier 154. Thus, during an early interval of operation, the sample-and-hold amplifier 154 is connected to receive the combined outputs of amplifiers 112 and 116 under the condition of zero input signal to amplifier 112. Amplifier 154 holds this signal, which represents the amplifier drift offset voltage. This offset voltage is then subtracted from the input to amplifier 116 by the connection of the output of amplifier 154 through a voltage follower amplifier 165 and a resistor 166 to the input of amplifier 116. Resistor 166 and resistor 114 form a voltage summation network to the input of amplifier 116.

After the "sample" operation by amplifier 154 is completed, the switching device 106 is shifted by the sequence control 134 operating through a connection 168 so the switching elements 158 and 160 are opened, and switching elements 102 and 104 are closed. When switching element 160 is opened, the previous input voltage to the amplifier 154 is held by capacitor 156 so that the output of the amplifier 154 continues for a reasonable time to represent the amplifier drift offset voltage which is therefore available for continuously correcting the combined outputs of the amplifiers 112 and 116. The switching device 106 is schematically illustrated as a relay device in which the contact elements are all shown as relay contacts, actuated by a schematically represented relay winding 172. However, the device 106 is preferably a digital electronic switch which is capable of much more rapid operation than an electromagnetic relay. Thus, the relay representation is only used to promote clarity in the drawing.

The other source of zero weight calibration error, the transducer offset signal, is corrected for by essentially taking a zero scale reading in terms of a count stored in counter 122, gating that reading through a multiple digit inverting (complement) gate 174 to a scale shift store register 176, and then adding the number stored in the scale shift store register 176 to the count stored in counter 122 by transfer through a non-inverting gate 178 before each later measurement of full weight. Since the counter 122 operates in binary digital notation, storing the complement of the zero weight reading in register 176, and then returning that complement to the counter 122, is the equivalent of storing the zero weight reading in counter 122 as a negative number which is then initially subtracted from the full weight reading. The gates 174 and 178 are preferably multiple digit gates, actually a plurality of gates operating in parallel, to transfer all of the digits between the counter 122 and the scale shift store register 176 at the same time.

It is one of the interesting features of the apparatus that the operation of the circuitry and the operation of the piezoelectric switch 136 is so rapid, and the response of the transducers 14D, E, F, and G is so slow by comparison, that it is possible to accurately and automatically correct for the zero error offsets between the time that a person who is weighing himself begins to step on the scale and the time when the transducers actually begin to register the person's weight. It has been found that there is an interval of about five milliseconds between the initial actuation of the piezoelectric switch 136 and the commencement of the registration of actual weight by the transducers 14D–G. It has also been found that five milliseconds is quite adequate for the multiple steps of waiting for the power to stabilize, storing the amplifier drift offset by means of the sample-and-hold amplifier 154 and then measuring and storing the transducer offset signal (scale shift count) in the register 176, preparatory to later accurate reading of the entire weight to be measured. The timing of all of the various operations necessary for accomplishing these steps, and for then taking the actual weight, is determined by the sequence control 134.

In order to simplify the arrangement for correcting for transducer offset, the transducer bridge 90 is preferably designed to have an initial offset in the positive weight direction, so that the zero weight error will always be high, even though transient shifts may be downward. Thus, the error value stored in the scale shift store 176 will always be subtracted from the later weight measurement counts in counter 122. This initial positive offset of the transducer bridge 90 may be supplied if necessary by factory adjustment of potentiometer 95. In subsequent operations of the circuit to measure and display actual weight, the amplifier drift offset signal is repeatedly updated in the sample-and-hold circuit including the amplifier 154. However, the initial transducer offset is continuously stored in complement form in the scale shift store 176. For each cycle of weight detection, the sequence control 134 actuates the gate 178 to initially set counter 122 to a negative (complement) value representing the transducer offset which must be subtracted from the total ultimate count of the counter 122 when making the weight measurement. Thus, as the weight measurement is taken, and the counter 122 is counted up, it counts up through zero and into a positive number representing the actual weight.

The digital circuits including counter 122 and scale shift store 176 preferably are all operated in binary digital code, with code conversion to decimal occurring only in the display driver 130. However, the operation of the complement gate 174 and the correction for transducer offset will be briefly illustrated in terms of decimal numbers in order to illustrate the principle of the operation of the transducer offset feature. Thus, assume that the counter 122 is capable of counting up to decimal 500, and beyond 500 additional counts simply make the counter start over with a count of 1. Then suppose that the zero error transducer offset signal corresponds to ten pounds. Ten pounds is then stored in the scale shift store 176 in complement form as number 490. The gate 178 operates then to transfer the ten pounds in complement form (490) to the counter 122. Then, when the actual weight is to be measured, the counter initially counts upwardly from 490 to 500 in response to the first ten counts received from converter 118, and then continues to count further pulses beginning at one and continuing on up to the actual weight. Thus, the ultimate contents of counter 122 represent ten less than the counts actually received in the actual weighing operation. In that way, the ten pound correction is appropriately applied to the total measurement.

Ultimately, after a predetermined interval of time in the order of twenty to thirty seconds, the sequence control issues a signal on connection 180 which is connected back to the reset input of flip flop 138 to reset that flip flop and turn off the weighing circuits.

While not previously mentioned, the sequence control 134 also preferably includes control connections to reset the transducer offset store register 176 and the display driver 130, and a connection indicated at 181 for enabling the LED display register 132 at appropriate times in the cycle of operation of the circuit.

In a preferred embodiment of the invention, virtually all of the circuit components of FIG. 7 except for the power supply 142, the piezoelectric switch 136, the bridge 90, and the operational amplifiers, may be combined in a single integrated circuit chip.

Figure 8:
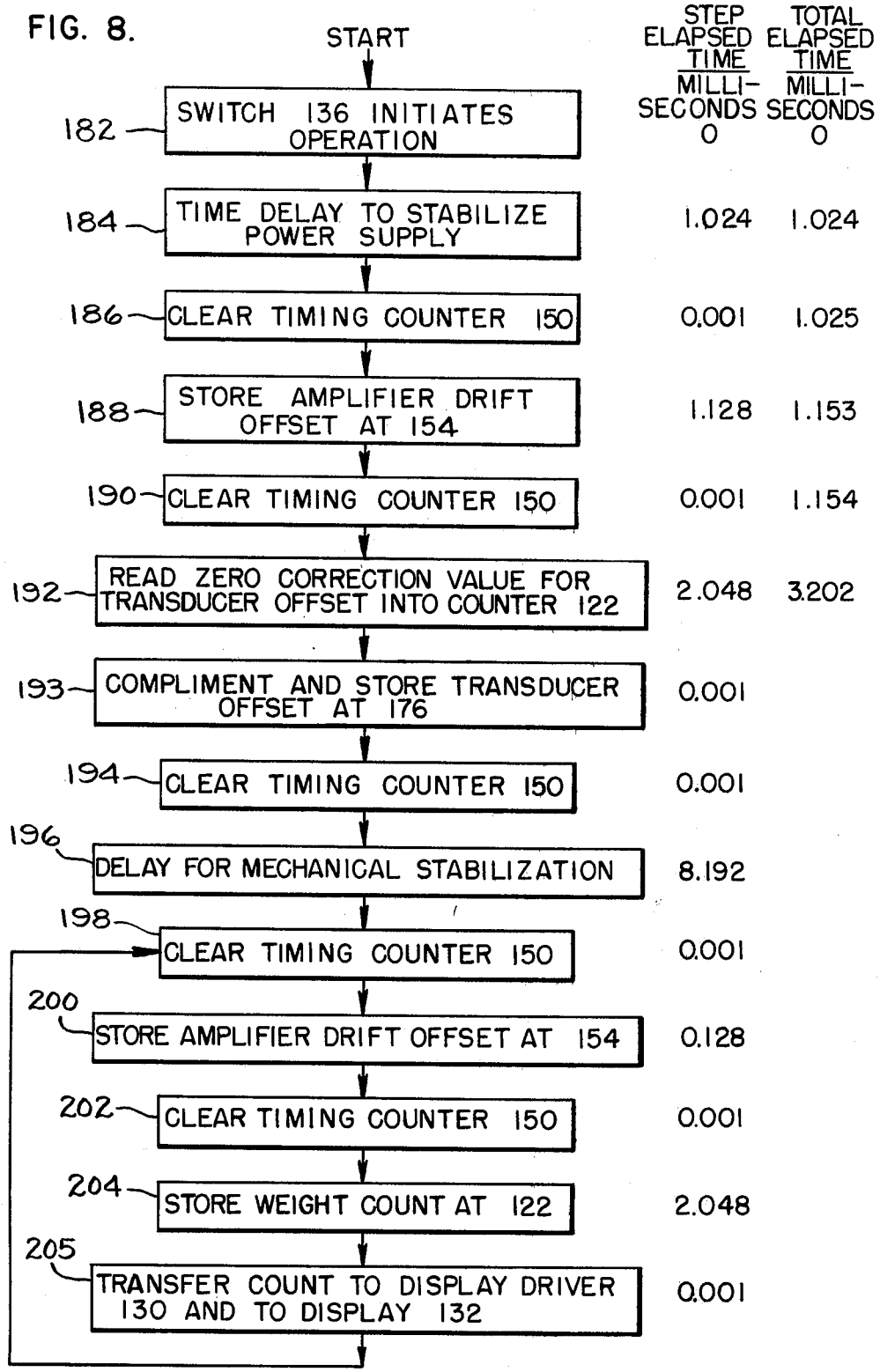
FIG. 8 is a logic flow chart illustrating the steps in the operation of the circuit of FIG. 7 and the timing of those steps.

FIG. 8 is a logic flow chart illustrating the order in which the various steps in the operation of the circuit of FIG. 7 occur. In order to provide an appreciation for the timing of the various steps, two columns are provided at the right side of FIG. 8 to indicate the elapsed time to perform each step and the total elapsed time through the end of that step, all of the times being given in milliseconds. All of the operations basically relate to the sequence which is determined by the sequence control 134.

As previously explained, the sequence is initiated by the operation of the switch 136. That step is indicated at 182 in FIG. 8. Then a delay occurs, as indicated at 184, for the purpose of permitting the power supply system to stabilize. This delay is preferably about one millisecond, and is timed by counting the timing counter 150 up to a count of 1,024 pulses from the one megaherz oscillator 126 to provide a time delay of exactly 1.024 milliseconds. Next, as indicated at 186, the sequence timing counter 150 is cleared. As indicated in the step elapsed time column, this takes only one thousandth of a millisecond, corresponding to one pulse from the oscillator. Next, as indicated at 188, the amplifier drift offset signal is stored at amplifier 154 in an interval of 0.128 milliseconds. Next, as indicated at 190, timing counter 150 is again cleared. Then, as indicated at 192, the zero correction value for transducer offset is read into counter 122. Reading the transducer offset value into counter 122 takes 2.048 milliseconds, corresponding to a count of 2,048 one MHz pulses. As indicated in the far right column, the total elapsed time to the completion of this step is just a little over three milliseconds (3.202 milliseconds). It has been found that, in this interval, the transducers 14D-G have not yet begun to register any appreciable resistance change signal in response to the applied weight, so that the zero correction value is truly representative of the zero load condition. Stated another way, the transducers 14D-G have inherent mechanical damping properties which prevent an appreciable resistance change signal during this initial interval. If desired, additional mechanical damping may be built into the scale structure so as to permit an even greater interval for zero correction. The total elapsed time is not carried beyond this step since it is not significant.

As indicated at 193, the transducer offset signal count stored in counter 122 is then transferred through gate 174 in complement form and stored in the transducer offset store 176. As indicated at 194, the timing counter 150 is then again cleared, as indicated at 194, and then, as indicated at 196, there is a delay for the mechanical stabilization of the scale. After that, the timing counter 150 is again cleared in step 198, the amplifier drift offset is again stored at 154 in step 200. Timing counter 150 is then again cleared at step 202 and the weight is actually measured in step 204. The weight count is then transferred to driver 130 and displayed at the display registor 132 in step 205.

Finally, the sequence goes back to step 198 and repeats steps 198, 200, 202, 204 and 205 again and again until the scale is turned off. Thus, if there are any changes in the weight which is being measured, or if there is further mechanical stabilization of the scale required, the weight registered is repeatedly corrected.

While not shown in FIG. 8, the sequence control 134 may also include a timer which times out after a reasonable interval for the user to read the scale such as thirty seconds. At the end of that time, the sequence control 134 may issue a signal on the connection 180 back to the reset input of flip flop 138, thus resetting that flip flop and turning off the scale circuit. Alternatively, logic circuits may be provided which reset flip flop 138 when the weight is removed from the scale and the output reading of the scale reaches a low value. Both of these alternatives for turning off the scale circuits are described more fully in the previously mentioned copending patent application Ser. No. (209,750) filed by Alfred W. DiMarzio.

It will be appreciated that FIG. 8 does not purport to show every single step in the operation of the circuit of FIG. 7. For instance, the transducer offset store 176 must be reset by the sequence control 134 at the beginning of the operation of the system, and the contents of the transducer offset store register 176 are gated through gate 178 to the counter 122 every time the counter 122 is about to receive a count from converter 118. In the first operation of counter 122 after the circuit is turned on, a zero value is transferred from the reset register 176 through gate 178 to counter 122 before the counter 122 receives the transducer offset count signal. Thus, counter 122 is effectively reset to zero value to provide a correct registration of the transducer offset count from a zero base. However, before each subsequent operation of counter 122, the complement value of the transducer offset is transferred from register 176 through gate 178 to counter 122 to provide the transducer offset correction.

While this invention has been shown and described in connection with particular embodiments, various alterations and modifications will occur to those skilled in the art. Accordingly, the following claims are intended to define the valid scope of this invention over the prior art, and to cover all changes and modifications falling within the true spirit and valid scope of this invention.

I claim:
1. A weighing scale comprising
   at least one mechanical-to-electrical signal transducer
      for sensing a weight to be weighed mechanically and for providing an electrical signal output indicative of a sensed weight, a weight registering circuit and a weight indicator connected to said transducer, said transducer being operable to produce a zero weight signal value which may vary in response to ambient conditions such as temperature, said transducer having a finite time delay in producing an electrical signal output in response to a weight to be measured, a fast acting pressure responsive switching means operable to provide a switching function in response to the initiation of the placement of a weight to be weighed upon said scale, said weight registering circuit including means operable in response to said switching function of said pressure responsive switching means to register and store a zero weight signal value before said signal transducer begins sensing the weight to be weighed, said weight registering circuit then being operable to register the difference between the zero weight signal value and the signal from said transducer while sensing the weight to be weighed for indication as the true weight.

2. A weighing scale as claimed in claim 1 wherein said fast acting pressure responsive switching means comprises a piezoelectric switch.

3. A weighing scale as claimed in claim 1 wherein said fast acting pressure responsive switching means includes a switching function amplifier.

4. A weighing scale as claimed in claim 1 wherein said weight registering circuit is operable to repeatedly measure the sensed weight and wherein said means to register and store the zero weight signal value before said signal transducer begins sensing the weight to be weighed is operable to continue the storage of the zero weight signal value for subtraction from every weight measurement.

5. A weighing scale as claimed in claim 1 wherein said means operable to register and store the zero weight signal value is operable to store that value in complement form for subtraction from the subsequently sensed weight in order to derive the true weight.

6. A weighing scale as claimed in claim 1 wherein said weight registering circuit includes a sequence control, said sequence control being operable to provide a predetermined sequence of operations for said weight registering circuit including the reading of the zero weight signal value, the storage of the zero weight signal value, and then the later sensing and registration of the full weight while subtracting the zero weight signal value.

7. A weighing scale as claimed in claim 1 wherein said switching means includes means for initiating the application of power to said weight registering circuit, the application of power to said weight registering circuit providing said switching function to register and store the zero weight signal value.

8. A weighing scale as claimed in claim 7 wherein said mechanical-to-electrical signal transducer comprises a body including a flexible metal substrate member carrying an electrical insulating material on one surface thereof and having a resistance element formed upon said insulating material and formed of a thick film resistor ink fused upon the electrical insulating material for measuring the force in terms of the change in resistance of the resistance element in response to strain in said body.

9. A weighing scale as claimed in claim 8 including a plurality of said transducers arranged at different positions and electrically interconnected for electrical summation of the transducer signals.

10. A weighing scale as claimed in claim 9 wherein there are provided four of said transducers respectively arranged near the four corners of said scale and electrically interconnected in a bridge circuit for electrical summation of the transducer signals.

* * * * *